United States Patent [19]

Luc

[11] 4,191,123

[45] Mar. 4, 1980

[54] METHOD OF SHAPING A SCREW TYPE CLAMPING COLLAR

[75] Inventor: André R. Luc, Ozoir-la-Ferriere, France

[73] Assignee: Tridon-Serflex S.A., Bry-sur-Marne, France

[21] Appl. No.: 913,115

[22] Filed: Jun. 6, 1978

Related U.S. Application Data

[60] Division of Ser. No. 850,358, Nov. 10, 1977, Pat. No. 4,103,637, which is a continuation of Ser. No. 692,335, Jun. 4, 1976, abandoned.

[30] Foreign Application Priority Data

Jun. 4, 1975 [FR] France ................................. 75 18313

[51] Int. Cl.² ............................................. B21D 45/00
[52] U.S. Cl. ................................ 113/116 H; 29/509; 72/335

[58] Field of Search .......................... 72/335, 324, 327; 113/116 H, 116 N, 116 U; 29/509, 510, 150; 24/274 R, 274 P, 274 WB

[56] References Cited

U.S. PATENT DOCUMENTS 1,839,530  1/1932  Braun ....................................... 72/335

FOREIGN PATENT DOCUMENTS 2136677  2/1973  Fed. Rep. of Germany ............. 24/274

*Primary Examiner*—Leon Gilden

[57] ABSTRACT

In accordance with the process of the present invention the flexible collar of a screw-type clamping collar is formed of a flexible metal strip of predetermined width, and one end thereof is either hot or cold stamped to force material of the collar outwardly along its edges at predetermined locations where transverse shoulders are desired to serve as stops for the clamp's saddle housing with sufficient rigidity and strength to withstand the pulling force applied to the clamping collar.

6 Claims, 16 Drawing Figures

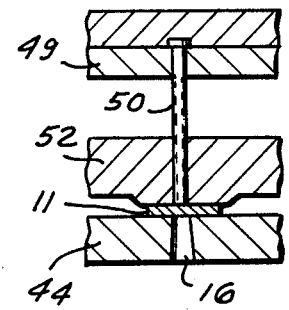
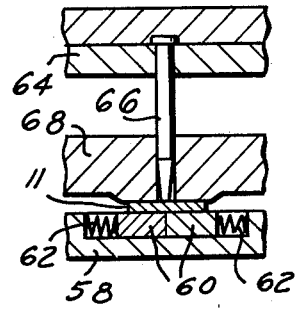
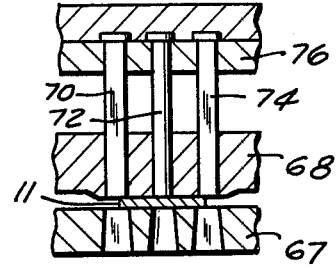
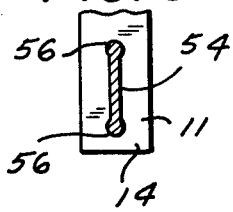
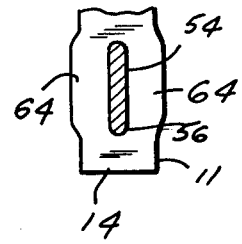
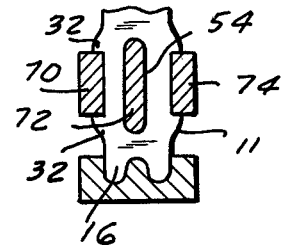
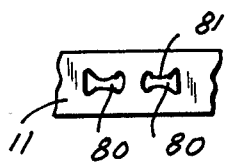
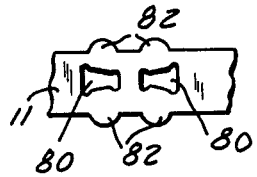
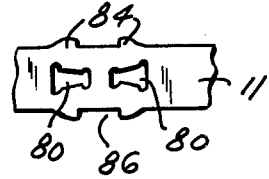
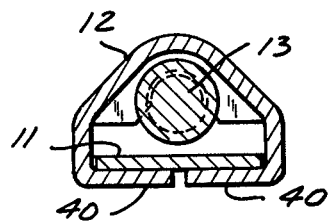

METHOD OF SHAPING A SCREW TYPE CLAMPING COLLAR

This is a division of application Ser. No. 850,358 filed Nov. 10, 1977, now U.S. Pat. No. 4,103,637 issued Aug. 1, 1978, which is a continuation of application Ser. No. 692,335 filed June 4, 1976, now abandoned.

The present invention relates to screw-type clamping collars and, more particularly to a process for treating or shaping one end of the collar to facilitate mounting of the collar's saddle housing thereon.

Screw-type clamping collars are a well known means for connecting flexible hoses or collars to other structures such as pipes. Such collars are particularly useful in the automotive field. The usual screw-type flexible collar includes a screw mounted for free rotation inside a housing, but held in a fixed axial position within the housing, which is secured on one end, or near one end, of a flexible band. The other end of the band or collar is engaged, when the band is bent, between the housing and the end of the band to which the housing is attached, so that the threads of the screw engage a corresponding toothed rack on the band. The rack begins near the end of the band and extends over a suitable length of the band selected in accordance with the sizes of the pieces or objects to be clamped. Turning of the screw adjusts the diameter of the collar and thus the clamping effect thereof.

A very critical point of the construction of screw-type clamping collars is the point where the saddle housing, carrying the adjusting screw, is secured to the band. It is this point on the band which sustains the entire reaction pull when the screw is turned in order to pull the rack end of the band to effect the clamping. This pull can reach a relatively very high level of efficiency in these clamps and thus produce high stresses in the connection of the saddle housing to the band.

Currently in order to obtain stopping and anchoring points for the saddle housing on the sides of the band, a band is generally used which is considerably wider than necessary for the clamping band or collar. Long tongues or recesses are then cut out along the edges of the band and transverse lugs are put on both sides of the recesses which then receive the corresponding lugs of the saddle housing. The housing lugs are then turned down or bent and sturdily positioned in a fixed position along the under sides of the band.

This mode of execution is costly since it involves using a band which is larger or wider than necessary, and there is thus a considerable loss of material.

It is an object of the process according to the invention to remedy these disadvantages.

According to an aspect of the present invention the so-called flexible band or collar is of a screw-type clamping collar made from a malleable strip of material, i.e. metal or other suitable materials, in a width only as wide as the desired width necessary for the flexible collar. One end of this band is then either hot or cold stamped at predetermined locations on the edge of the end to force material at those places laterally outwardly and form transverse shoulders defining the desired stops for the saddle housing with sufficient rigidity and strength to withstand the pulling force applied to the clamping collars.

The above, and other objects, features and advantages of the present invention will be apparent in the following detailed description of an illustrative embodiment thereof which is to be read in connection with the accompanying drawings, wherein:

FIGS. 3 and 4 are schematic sectional views showing the process of making transverse shoulders in the collar or band, wherein FIG. 3 illustrates the punch and anvil before the operation and FIG. 4 illustrates the end of the operation;

FIG. 7 is a transverse sectional view, on an enlarged scale, showing the band assembled on the saddle housing;

FIGS. 8, 10 and 12 are schematic side sectional views, similar to FIGS. 3 and 4, illustrating another punch and anvil arrangement for use in forming transverse stops on the band;

FIGS. 9, 11 and 13 are plan views of the band respectively showing the configuration of the band after treatment in the apparatus shown in FIGS. 8, 10 and 12 respectively; and FIGS. 14, 15 and 16 are top plan views of another band illustrating another method of making transverse stop shoulders on the band.

Figure 1:
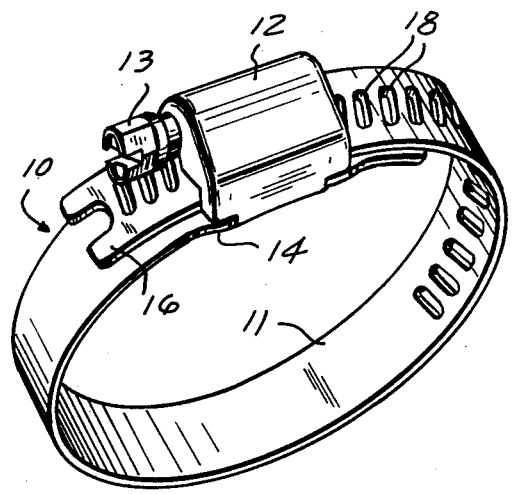
FIG. 1 is a perspective view of a screw-type clamping collar according to the present invention.
Figure 2:
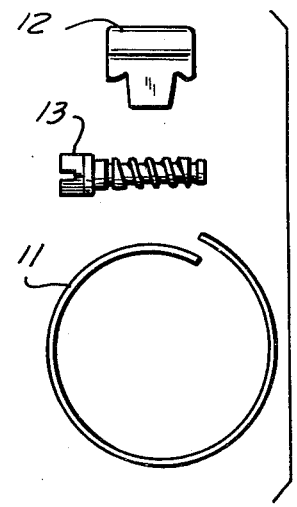
FIG. 2 is an exploded side view of the clamping collar of FIG. 1, showing the individual elements making up the collar.

Referring now to the drawings in detail, and initially to FIG. 1 thereof, a screw-type clamping collar 10 constructed by use of the method of the present invention is illustrated which includes a flexible band 11, a saddle housing 12, and a screw 13. The latter is mounted in any known manner for free rotation inside housing 12, but is held by the housing in a fixed axial position.

The saddle housing, with its screw 13, is mounted adjacent one end 14 of flexible band 11. The band has at its other end 16 a number of transverse openings 18 formed therein which define a gear rack that engages and cooperates with the threads of screw 13, when this end is engaged in the housing between the screw and the end 14 of the band.

The flexible band or collar 11 is preferably formed of a malleable material, such as metal, with a uniform width L selected to be the width necessary for the use to which the clamp is to be placed. The length of the band is cut such that the band will make, after rolling, a collar having a specific diameter.

Figure 3:
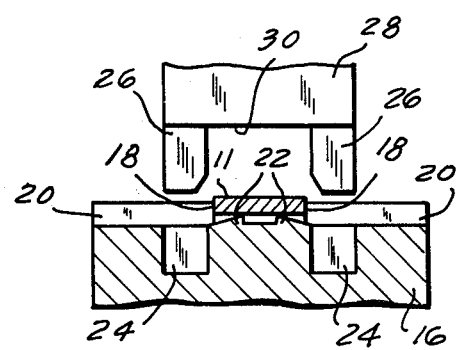

In accordance with the present invention, the end 14 of the band is placed on an anvil or boss 16 which has longitudinal guiding tracks 18 formed in raised parts 20 thereon. The band rests on four bosses 22 formed in the base of the anvil. Each boss has a rectangular top surface in plan which slopes (as seen in FIG. 3) from a point near the median axis of the band downwardly and away from the band. Between the bosses, clearings or recesses 24 are formed in the anvil to enable the passage of tongs 26 carried by a reciprocal punch head 28.

Figure 4:
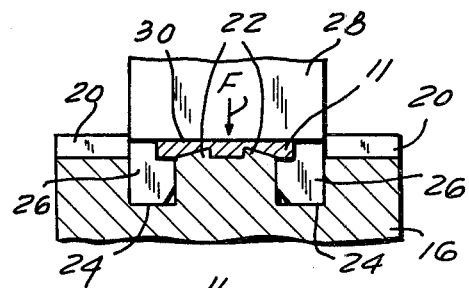

As seen in FIG. 4, when punch head 28 is operated downwardly, in the line of arrow F, (as for example by a cam or the like in the conventional manner) the tongs or punches 26 penetrate into the anvil recesses 24 and the bottom 30 of the punch head engages the flexible band 11. The striking of the band in this manner pushes the malleable material of the band laterally in the direction of arrows f, to form the pairs of stops or shoulders 32 on the band. At the same time, the tongs 26 prevent the band materials from flowing between these shoulders and thus form recesses 34 therebetween (see FIG. 6).

Figure 6:
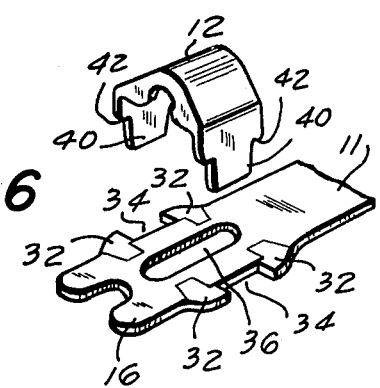
FIG. 6 is a partial exploded perspective view of the finished band ready for assembly with a screw-bearing saddle housing.
Figure 5:
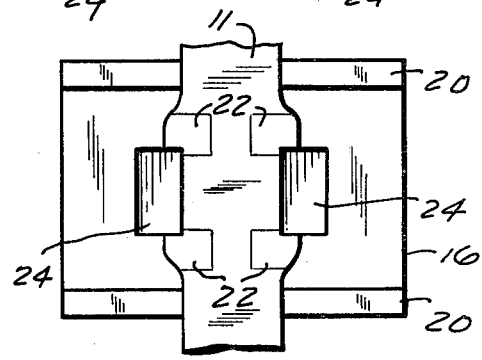
FIG. 5 is a top plan view of the anvil of FIGS. 3 and 4 with the band placed on the anvil and after completion of the punching operation.

Additional operations may be performed on the band end 14 by cutting a central opening 36 therein forming a profiled end 38 as shown in FIG. 6. These operations can be performed in any known manner.

The saddle housing 12, having screw 3 mounted therein is secured to the end 14 of band 11 by its lugs 40 which are initially straight and placed between the respective pairs of shoulders 32 (see FIG. 6) until its own shoulders 42 engage the stops 32. The lugs are then turned or bent down under the band to complete the assembly (see FIG. 7).

The flexible band 11 can also be shaped to form shoulders 32 by the apparatus illustrated in FIGS. 8 to 13. As seen therein the end 14 of band 11 is placed and properly guided in guide tracks or the like on an anvil or base 44 having an opening 46 therein. A reciprocal punch-carrier 49 having a punch 50 mounted thereon is guided in a pressure plate 52 above anvil 44. The carrier and plate are reciprocated in any known manner to cause the punch to cooperate with the anvil and punch or cut a median slot 54 having bulged-out or rounded ends 56 in the median portions of band 11 (see FIG. 9). The slotted band end is then placed and guided on a second anvil 58 having, underneath the positions at which the band is supported, two laterally movable parts 60 biased by springs 62. A second punch assembly incluidng a reciprocal punch carrier 64, a punch 66 and a pressure plate 68 are located above this second anvil and operation thereof against the anvil will cause the second punch 66, which is wider than punch 50, to penetrate slot 56 and move the anvil parts 60 apart from each other, against the bias of the springs thus forcing the band material to move adjacent slot 56 to form protuberances 64, while the conical punch 66 expands slot 56 (see FIGS. 10 and 11).

The end 14 of band 11 is then placed and guided on a third anvil 67 where it is held in place by a reciprocal pressure plate 68 in which three punches 70, 72, 74 are slidable. These punches are carried by a reciprocal punch-carrier 76. Upon operation or reciprocation of carrier 76 toward anvil 67 (which has complementary openings therein) the punches 72, 74 form the desired shoulders 32 separated by recesses or spaces 24 (see FIGS. 12 and 13) and the punch 72 further widens slot 54. If desired the punch may be designed to also cut the end 16 of the band (see FIG. 13) to form a profiled end.

According to another embodiment of the invention (shown in FIGS. 14, 15 and 16) band 11 is, in a first operation, punched (in a process similar to that shown in FIG. 8) to form generally bow-tie shaped openings 80 therein in slightly spaced relation to each other (see FIG. 14). These openings have inwardly curved sides 81. The band is then punched again, between a punch and anvil (in the same manner as described above with respect to FIG. 10) in order to move the side edges of the band forming lateral protrusions 82, while enlarging openings 86 (see FIG. 15). The inwardly curved sides 81 of the originally formed openings provide the material in the band that allows protrusions to be formed without substantial reduction in the thickness of the band. The lateral protrusions are then punched again (in the same manner as described with respect to FIG. 12) in order to form transverse shoulders 84 with recesses 86 therebetween (see FIG. 16).

From the above it is seen that by the present invention the collar or band is treated and shaped to form a strong and convenient mount for assembly of the saddle housing with the band. Moreover the process allows the flexible band to be formed initially only as wide as required for the completed collar. This results in a substantial savings of material as compared to previously proposed structures with a resulting reduction in manufacturing costs. The process is performed by a series of relatively simple operations on the band to achieve the desired shape; and the resulting transverse shoulders provide substantial strength in the final assembly at the critical point in the collar where stresses are transmitted from the saddle housing to the flexible band.

Although illustrative embodiments of the present invention have been described herein with reference to the accompanying drawings it is to be understood that the invention is not limited to those precise embodiments thereof but that various changes and modifications may be effected therein by one skilled in the art without departing from the scope or spirit of this invention.

What is claimed is:

1. The method of treating a flexible band for use in a screw-type clamping collar having a saddle housing including a pair of spaced legs thereon comprising the steps of forming the flexible band of malleable material in a predetermined width; stamping one end of said band along its edges to extend the material of the band beyond the edges thereof and form transverse shoulders on said band edges in spaced relation to each other, said stamping step comprising the step of positioning said band in a stamping press on an anvil shaped to allow lateral movement of the band material, with respect to the remainder of the band edges, at two spaced areas on each side of said one end of the band where the shoulders are to be formed; and striking the band on the anvil to force the material of the band laterally outwardly at said spaced areas to form said transverse shoulders while preventing outward flow of band material between said spaced areas without changing the thickness of the band therebetween, whereby the legs of said housing may be placed between the shoulders and bent under the band with said shoulders, integral with the band, resisting longitudinal movement of the housing along the band and the forces applied thereto when the clamp is used.

2. The method as defined in claim 1 wherein said stamping step comprises the step of cold stamping said shoulders in the band material.

3. The method as defined in claim 1 wherein said stamping step comprises the step of hot stamping said shoulders in the band material.

4. A process as defined in claim 1 wherein said anvil has tracks formed therein for holding said one end of the band in a fixed position and a plurality of bosses between the tracks located to be below said band, said bosses being profiled and sloped in height, with their highest point adjacent the median axis of the band in said tracks, to force the material of the band laterally outwardly from the side edges thereof.

5. A process for shaping a flexible collar for use in a screw-type clamping collar comprising the steps of forming a flexible collar from an elongated strip of malleable material in a width as wide as the desired width of the flexible collar; striking the collar adjacent the ends thereof and forcing material along the edges of the collar outwardly of the edges only at two predetermined spaced positions on each edge of the band, said striking step comprising the step of flattening the collar material at said predetermined positions between a punch and an anvil shaped to permit the material to move and be forced out laterally of the collar edges only at said predetermined positions while blocking material flow therebetween; thereby to form transverse stop shoulders on the collar edges defining stops of sufficient rigidity and strength to withstand the pulling force applied to the clamping collar.

6. The process according to claim 5 wherein said anvil includes bosses located below said one end of said collar suitably profiled and sloped in their height, with their highest point being closest to the median axis in the width of the collar, so as to force out the material of the collar laterally outwardly, to form the transverse shoulders with a thickness appreciably corresponding to that of the collar, said anvil including longitudinal tracks formed therein for firmly holding said collar in position.

* * * * *